United States Patent
Paolucci

(10) Patent No.: US 9,139,082 B2
(45) Date of Patent: Sep. 22, 2015

(54) VEHICLE FUEL TANK PUMP

(71) Applicant: Patrick Paolucci, Holmdel, NJ (US)

(72) Inventor: Patrick Paolucci, Holmdel, NJ (US)

( * ) Notice: Subject to any disclaimer, the term of this patent is extended or adjusted under 35 U.S.C. 154(b) by 256 days.

(21) Appl. No.: 13/779,424

(22) Filed: Feb. 27, 2013

(65) Prior Publication Data

US 2014/0238539 A1   Aug. 28, 2014

(51) Int. Cl.
| | |
|---|---|
| *B60K 15/01* | (2006.01) |
| *B60K 15/00* | (2006.01) |
| *B67D 7/32* | (2010.01) |
| *B67D 7/38* | (2010.01) |
| *B60K 15/03* | (2006.01) |
| *B67D 7/62* | (2010.01) |
| *B60K 15/04* | (2006.01) |

(52) U.S. Cl.
CPC .............. *B60K 15/00* (2013.01); *B67D 7/3272* (2013.01); *B67D 7/38* (2013.01); *B60K 2015/03243* (2013.01); *B60K 2015/03473* (2013.01); *B60K 2015/0458* (2013.01); *B60K 2015/0464* (2013.01); *B67D 7/62* (2013.01)

(58) Field of Classification Search
CPC .............. B60K 2015/0458; B60K 2015/0464; B60K 2015/03243; B60K 2015/03473
USPC ..... 141/65, 94, 98, 192, 231; 123/1 R, 198 C
See application file for complete search history.

(56) References Cited

U.S. PATENT DOCUMENTS

| | | | | |
|---|---|---|---|---|
| 3,774,654 | A * | 11/1973 | Hjermstad | 141/42 |
| 4,997,003 | A * | 3/1991 | Brennan | 137/147 |
| 5,092,294 | A * | 3/1992 | Jackson | 123/198 C |
| 5,234,016 | A * | 8/1993 | Winn | 137/142 |
| 5,257,651 | A * | 11/1993 | Thompson et al. | 141/65 |
| 5,332,010 | A * | 7/1994 | Thompson et al. | 141/7 |
| 5,718,260 | A * | 2/1998 | Leonardi | 137/355.16 |
| 5,921,262 | A * | 7/1999 | Campbell | 137/1 |
| 6,056,028 | A * | 5/2000 | Crawford | 141/382 |
| 6,167,903 | B1 * | 1/2001 | Newman | 137/351 |
| 6,938,612 | B2 * | 9/2005 | Porter | 123/509 |
| 7,025,082 | B1 * | 4/2006 | Wood | 137/351 |
| 7,171,995 | B2 * | 2/2007 | Eshenour | 141/323 |
| 7,464,735 | B2 * | 12/2008 | Shultz | 141/343 |
| 2006/0207681 | A1 * | 9/2006 | Purington | 141/231 |
| 2006/0278664 | A1 * | 12/2006 | Shultz | 222/461 |
| 2008/0223660 | A1 * | 9/2008 | Williams et al. | 184/1.5 |
| 2009/0044866 | A1 * | 2/2009 | Pearson | 137/87.01 |

* cited by examiner

*Primary Examiner* — Nicolas A Arnett

(57) ABSTRACT

A fuel pump connected to a vehicle fuel tank is disclosed herein. The fuel pump may be operatively connected to a fuel tank and a retractable hose. The retractable hose may extend from the vehicle. A switch may activate the pump and thereby pump fuel from the fuel tank and into the retractable hose. A user may fill fuel containers or other machinery when the fuel pump is activated.

12 Claims, 2 Drawing Sheets

VEHICLE FUEL TANK PUMP

BACKGROUND OF THE INVENTION

The present invention relates to a fuel pump and, more particularly, to a fuel pump that pumps fuel from a fuel tank of a vehicle.

Currently, many business and house machinery require gasoline to run. For example, generators, lawn mowers, snow blowers, leaf blowers, weed whackers, chainsaws, and the like may use gasoline. However, if the gasoline is left in the motors for too long, the gasoline may go bad. In addition storing multiple gallons of gasoline in a garage is dangerous. An explosive fire could inadvertently erupt from several sources of ignition. Further, it is easy to forget about and thereby run out of gasoline. Transporting gasoline to a home or business may require one to go to a gas station and fill up multiple gas containers. However, this can be messy and may be dangerous. Further, in emergency situations, a gas station may not be easily accessible.

As can be seen, there is a need for an easier way to access fuel.

SUMMARY OF THE INVENTION

In one aspect of the present invention, a mobile fuel supply device comprises: a vehicle comprising a fuel tank that is configured to store fuel and wherein the fuel tank is connected to a vehicle fuel inlet configured to receive fuel; a fuel pump operatively connected to the fuel tank; a retractable hose having a first end, a second end and a body, wherein the second end is connected to the fuel pump and the first end is projecting from the vehicle and is configured to be accessed by a user; and a switch operatively connected to the fuel pump, wherein when the switch is activated, the fuel pump pumps fuel from the fuel tank and through the retractable hose.

In another aspect of the present invention, in a retracted position the body of the retractable hose is stored within the vehicle and in an extended position the body of the retractable hose is at least partially exposed outside of the vehicle.

In another aspect of the present invention, a pass-thru grommet is attached to the vehicle, wherein the retractable hose is configured to fit within the pass-thru grommet, and wherein the body of the retractable hose retracts and extends through the pass-thru grommet.

In another aspect of the present invention, the retractable hose further comprises a hose end nipple, wherein the hose end nipple is wider than the pass-thru grommet and thereby the hose end nipple rests against the pass-thru grommet in the retracted position.

In another aspect of the present invention, the pass-thru grommet is adjacent to the vehicle fuel inlet.

In another aspect of the present invention, a fuel hose connects the fuel tank to the pump and connects the fuel pump to the retractable hose.

In another aspect of the present invention, a fuel filter is connected to the fuel pump.

In another aspect of the present invention, a timer configuration comprises: a digital flow timer activated by the switch, wherein the digital flow timer is operatively connected to the pump, wherein the digital flow timer comprises a control interface, and wherein the control interface is configured to set a time on the digital flow timer; and wherein the timer configuration is configured for a user to set the digital flow timer to a set amount of time via the control interface, and when the set amount of time expires, the pump is activated and fuel is pumped from the fuel tank and into the retractable hose.

In another aspect of the present invention, the digital flow timer further comprises a display that displays the set amount of time.

In another aspect of the present invention, the control interface is configured to set an amount of fuel pumped from the tank.

In another aspect of the present invention, a fuse connects to a switch that activates a digital flow timer and a solenoid valve and thereby powers the fuel delivery system.

In another aspect of the present invention, a vehicle fuel door is configured to open and close, wherein an open state provides access to the retractable hose and a closed state shelters the retractable hose.

In another aspect of the present invention, the fuel door is locked in the closed state.

These and other features, aspects and advantages of the present invention will become better understood with reference to the following drawings, description and claims.

DETAILED DESCRIPTION OF THE INVENTION

Figure 1:
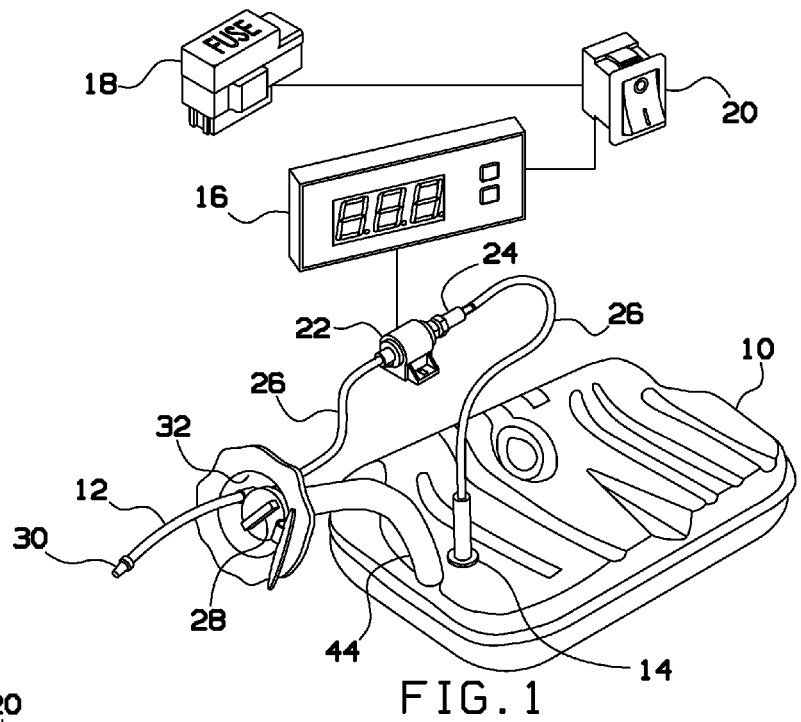
FIG. 1 is a schematic diagram of an embodiment of the invention.
Figure 2:
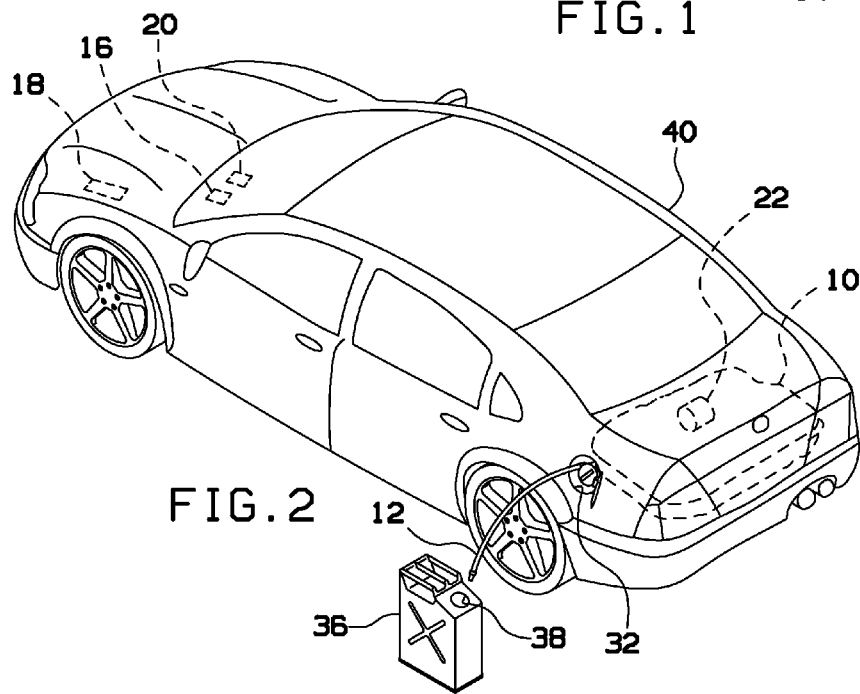
FIG. 2 is a perspective view of an embodiment of the invention shown in use.
Figure 3:
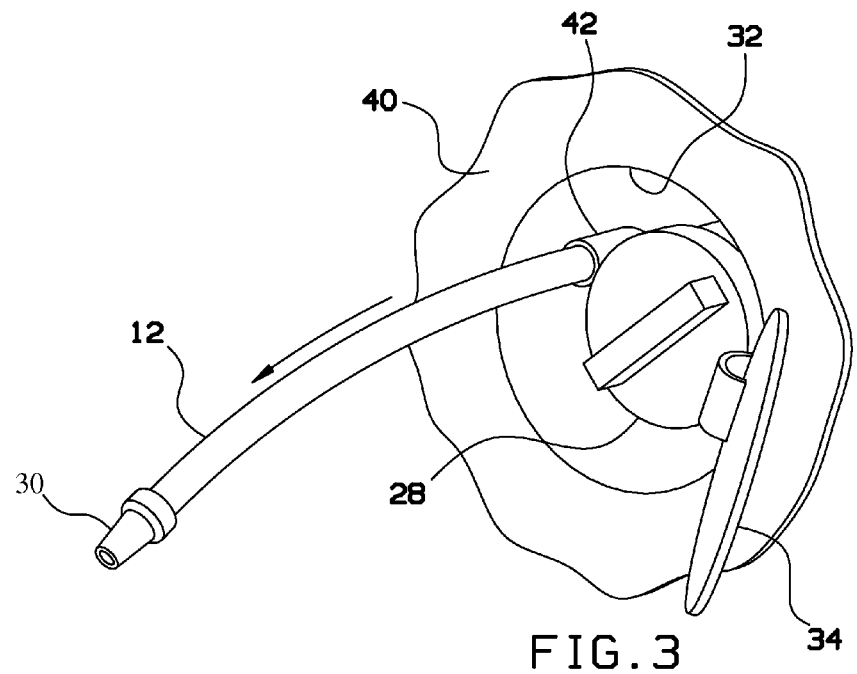
FIG. 3 is a detailed perspective view of an embodiment of the invention showing the retractable fill hose 12 in the extended position.
Figure 4:
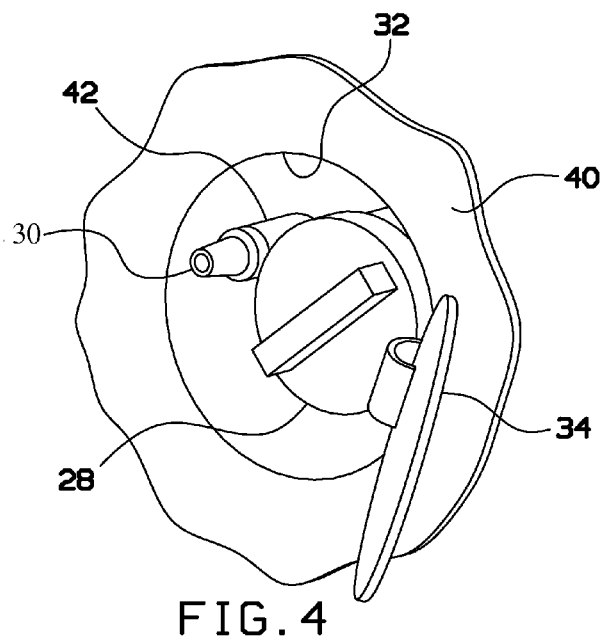
FIG. 4 is a detailed perspective view of the invention showing the retractable fill hose 12 in the retracted position.

The following detailed description is of the best currently contemplated modes of carrying out exemplary embodiments of the invention. The description is not to be taken in a limiting sense, but is made merely for the purpose of illustrating the general principles of the invention.

Broadly, an embodiment of the present invention provides a fuel pump that is connected to a vehicle fuel tank. The fuel pump may be operatively connected to the fuel tank and a retractable hose. The retractable hose may extend from the vehicle for easy use. A switch may activate the pump and thereby pump fuel from the fuel tank and into the retractable hose. A user may fill up fuel containers or other machinery when the fuel pump is activated. The present invention may include a mobile mini gas station with a pump that may pump gas from a vehicle to a gas container.

Referring to FIGS. 1 through 4, the present invention may include a vehicle 40 with a fuel tank 10 that is configured to store fuel. The fuel that may be stored within the tank 10 may include gasoline, diesel fuel, natural gas, and the like. A vehicle fuel inlet 32 may be accessed by a vehicle fuel door 34. The vehicle fuel inlet 32 may connect to the fuel tank 10 and may receive fuel. The vehicle fuel door 34 may be locked when in a closed position. In certain embodiments, a gas cap 28 may cover the vehicle fuel inlet 32. In certain vehicles, a fuel inlet hose 44 may connect the vehicle fuel inlet 32 to the gas tank 10. In such embodiments, when a user opens the vehicle fuel door 34 and removes the gas cap 28, the user may insert a fuel nozzle into the fuel inlet 32 and thereby fill the fuel tank 10 with fuel.

The present invention may further include a retractable hose 12. The retractable hose may include a polymer hose that extends from the vehicle. The retractable hose 12 may include a first end, a second end and a body. The first end may project from the vehicle and may be configured to be accessed by a user. In certain embodiments, the retractable hose 12 may be in a retracted position and an extended position. In the retracted position, the body of the retractable hose 12 may be substantially stored within the vehicle 40. In an extended position the body of the retractable hose 12 may be at least partially exposed and projecting from the vehicle 10.

In certain embodiments, the present invention may further include a retractable hose pass-thru grommet 42. The grommet 42 may attach to the vehicle 40 and in certain embodiments, may be located adjacent to the fuel inlet 32. The retractable hose 12 may fit within the grommet 42. In certain embodiments, the body of the retractable hose may retract and extend from the grommet 42. The retractable hose 12 may further include a hose end nipple 30 located at the first end. The hose end nipple 30 may have a greater width than the pass-thru grommet 42 and therefore may rest against the grommet 42 in the retracted position. A rubber cap may fit onto the end nipple 30 when the present invention is not in use.

The present invention may further include a fuel pump 22 that is operatively connected to the fuel tank 10. The second end of the retractable hose 12 may be connected to the fuel pump 22 and thereby the fuel pump 22 may pump fuel from the fuel tank 10 and into the retractable hose 12. In certain embodiments, a fuel hose 26 may connect the fuel tank 10 to the fuel pump 22 and a fuel hose 26 may connect the fuel pump 22 to the retractable hose 12. The retractable hose 26 may be connected to the fuel tank 10 by a reinforced nipple 14. In certain embodiments, a fuel filter 24 may be connected to the fuel pump 22. The fuel filter 24 may strain or screen out foreign matter helping to ensure that clean fuel is delivered.

In certain embodiments a switch 20 may be operatively connected to the fuel pump 22. The switch 20 may be located at the dashboard of the vehicle 10, near the retractable hose 12, on the retractable hose 12 or in any desired location. The switch 20 may activate and deactivate the fuel pump 22. When the switch 20 is activated, the fuel pump 22 may pump fuel from the fuel tank 10 and into the retractable hose 12. When the fuel pump 22 has been activated a user may fill a fuel container 36 by extending the retractable hose 12 and placing the first end of the retractable hose 12 over an opening 38 of the fuel container 36. However, the user may also directly fill any fuel powered machinery such as generators, lawn mowers, snow blowers, leaf blowers, weed whackers, chainsaws, and the like.

In certain embodiments, the present invention may further include a timer configuration, as illustrated in FIG. 1. The timer configuration may include a digital flow timer 16. The digital flow timer 16 may be powered by the vehicle battery by connecting with a fuse 18. The digital flow timer 16 may be operatively connected to the pump 22. In certain embodiments, the digital flow timer 16 may be activated by the switch 20. The digital flow timer 16 may include a control interface and a display. The control interface may be configured to set a time on the digital flow timer and the display may show the set time. When the set amount of time expires, the pump may be activated and fuel may be pumped from the fuel tank and into the retractable hose.

In certain embodiments, the present invention may pump around one gallon of fuel from the fuel tank 10, which may be regulated by a solenoid valve. The solenoid valve may be attached to the fuel hose 26, the fuel pump 22 and the like. In certain embodiments, the digital flow timer 16 may be configured to control the amount of fuel pumped from the fuel tank 10 and thereby may control the solenoid valve. For example, a user may set an amount of fuel to be pumped on the control interface. Then the solenoid valve would only allow the pump to pump out the amount inputted by the user.

It should be understood, of course, that the foregoing relates to exemplary embodiments of the invention and that modifications may be made without departing from the spirit and scope of the invention as set forth in the following claims.

What is claimed is:

1. A mobile fuel supply device comprising:
    a vehicle comprising a fuel tank that is configured to store fuel and wherein the fuel tank is connected to a vehicle fuel inlet configured to receive fuel;
    a fuel pump operatively connected to the fuel tank;
    a retractable hose having a first end, a second end and a body, wherein the second end is connected to the fuel pump and the first end is projecting from the vehicle and is configured to be accessed by a user; and
    a digital flow timer operable to receive a set amount of time, wherein when the set amount of time expires, the pump is activated and fuel is pumped from the fuel tank and into the retractable hose.

2. The mobile fuel supply device of claim 1, further comprising a retracted position and an extended position, wherein the body of the retractable hose is stored within the vehicle in the retracted position and the body of the retractable hose is at least partially exposed outside of the vehicle in the extended position.

3. The mobile fuel supply device of claim 2, further comprising a pass-thru grommet attached to the vehicle, wherein the retractable hose is configured to fit within the pass-thru grommet, and wherein the body of the retractable hose retracts and extends through the pass-thru grommet.

4. The mobile fuel supply device of claim 3, wherein the retractable hose further comprises a hose end nipple, wherein the hose end nipple is wider than the pass-thru grommet and thereby the hose end nipple rests against the pass-thru grommet in the retracted position.

5. The mobile fuel supply device of claim 3, wherein the pass-thru grommet is adjacent to the vehicle fuel inlet.

6. The mobile fuel supply device of claim 1, further comprising a fuel hose connecting the fuel tank to the pump and connecting the fuel pump to the retractable hose.

7. The mobile fuel supply device of claim 1, further comprising a fuel filter connected to the fuel pump.

8. The mobile fuel supply device of claim 1, wherein the digital flow timer further comprises a display that displays the set amount of time.

9. The mobile fuel supply device of claim 1, further comprising a control interface operable to receive and control a set amount of fuel to be pumped from the tank.

10. The mobile fuel supply device of claim 1, further comprising a fuse connecting to a switch that activates the digital flow timer.

11. The mobile fuel supply device of claim 1, further comprising a vehicle fuel door configured to open and close, wherein an open state provides access to the retractable hose and a closed state shelters the retractable hose.

12. The mobile fuel supply device of claim 11, wherein the fuel door is locked in the closed state.

* * * * *